INVENTORS.
ROBERT FOURCADE.
MARCEL DUHOO.
BY CLAUDE HABERER.

ATTORNEYS.

United States Patent Office 3,227,665
Patented Jan. 4, 1966

3,227,665
POLYMERIZABLE, CROSS-LINKABLE, UNSATURATED POLYESTER RESIN COMPOSITION AND METHOD OF MAKING SAME
Robert Fourcade, Gosnay, Marcel Duhoo, Bruay-en-Artois, and Claude Haberer, Houdain, France, assignors to Houillers du Bassin du Nord et du Pas-de-Calais, Douai (Nord), France, a French public establishment of France
Filed July 11, 1962, Ser. No. 209,027
9 Claims. (Cl. 260—2.5)

This application is a continuation-in-part of patent application Serial No. 805,386 filed April 10, 1959, now abandoned.

This invention is concerned with new and useful moldable polymeric compositions which remain stable without hardening for extended periods of time but which can be hardened and set by the application of heat and pressure. More particularly, it is concerned with polymeric compositions of homogeneous gel-like consistency comprising an unsaturated, cross-linkable polyester in admixture with a polymerizable vinylidene compound, said composition containing benzoyl peroxide as a polymerization catalyst, stannous chloride as a gel promoter and 4-methyl-2,6-di-tertiary butylphenol as a polymerization inhibitor.

Polyester resins containing at least some degree of unsaturation in admixture with a polymerizable vinyl compound for cross-linking have been known for some time. They can be molded at elevated temperatures (say 100° to 150° C.) under pressure to cause cross-linking polymerization to occur therein and to produce hard, strong finished articles.

These compositions have a number of recognized disadvantages. When such compositions are made from fluid polyesters using a relatively volatile cross-linking vinyl monomer of high fluidity, such as styrene, they are sticky or "tacky" when handled and tend to exude liquid when placed under pressure. They have a high shrinkage coefficient and molded articles prepared from them are subject to easy cracking and breaking, particularly when the articles have non-uniform cross-sections. A highly serious defect of such compositions is that they can only be used in compression. Therefore, injection, transfer molding, extrusion and similar techniques are inapplicable thereto. Moreover, the compression and slight degree of transfer occurring in molds, even those of simple shape, causes an orientation of any reinforcing fiber used in the direction of readiest slippage and such orientation usually detracts from the mechanical characteristics of the resulting article. As a result of these difficulties, compositions of this class will not yield homogeneous finished articles unless extra precautions are taken and their use is substantially restricted to the production of articles of simple configuration having uniform cross-sections.

The tendency of the compositions to exude liquid under pressure can be partially overcome by adding sufficient fillers and reinforcing materials so that substantially dry compositions result. However, the desired improvement in mechanical characteristics is not achieved since the reinforcing fiber is often crushed in the mixing operation.

In an attempt to overcome the above enumerated defects it has been proposed to replace the volatile, highly fluid, cross-linking agent with monomers of relatively high viscosity and low volatility, such as allyl phthalate, methyl styrene and others. However, the increased cost of such compositions is not compensated for by the results achieved. It has been found that as the viscosity increases, the wetting rate of the filler and reinforcing fiber become slower and less efficient with the result that maximum concentration of such filler and fiber that can be incorporated rapidly drops off. As a consequence, with materials thus prepared mechanical performance of the finished articles is greatly reduced and this seriously restricts the range of commercial utility of the products. Moreover, as the proportion of incorporated filler attains a value approximating that at which the desired improved mechanical characteristics might be expected, the resulting compositions assume a dry, inelastic consistency and the fiber tends to break up during mixing. Because of this, the uses of such compositions are restricted to the manufacture of parts of uniform thickness in which the degree of transfer of materials in the mold is very low and mechanical characteristics remain poor. Compositions prepared with cross-linking monomers of high viscosity and low volatility therefore are no more amenable than compounds prepared with cross-linking monomers of low viscosity and high volatility to present day shaping procedures, such as injection and transfer molding and extrusion.

To overcome the previously enumerated deficiencies, attempts have been made to prepare compositions by a process involving an intermediate gelling of the liquid substance but the gels thus obtained are unstable and cannot be stored for any appreciable length of time, not even for a few weeks. They must be utilized practically at once. This is because the initiation of the polymerization reaction which causes the intermediate gelling to occur cannot be arrested at will to produce compositions having a selected gel-like consistency appropriate to the particular use contemplated. Once polymerization has started it will proceed uninterruptedly until full cross-linking has been achieved. Compositions prepared by this process therefore have defects similar to those set forth above.

All of the prior art compositions set forth above are characterized by the most serious disadvantage that they are not stable and must be used immediately, or at least within a very short time. This is a serious commercial problem since, for example, it is impossible to prepare moldable compositions and ship them to a distant point to be molded. Moreover, it is not possible to prepare moldable compositions which can be stored until a need for them arises. Hence, production techniques must be devised whereby the moldable compositions are prepared and molded within a relatively short period of time.

It is an object of this invention to prepare compositions that will be substantially free of the above enumerated defects and which accordingly will be applicable to a vast field of novel uses and applications of great commercial and engineering interest.

Another object is to prepare novel compositions wherein the proportion of incorporated filler fiber and reinforcement can attain very high values and which will nevertheless behave similarly to plastic material that can be shaped at ordinary temperatures and directly molded at elevated temperatures and pressures into hard, strong finished articles by any of the modern shaping techniques applicable to thermoplastics, even though the finished articles are of cross-linked character.

Another object of the invention is to prepare compounds that are shapable at ordinary temperature, thermoplastic, stable on storage and capable of being set at any desired subsequent time. The compositions prepared in accordance with this invention have the property of being thermoplastic up to temperatures of about 70° to 80° C. while becoming thermosetting under pressure at somewhat higher temperatures, such as 120° to 130° C.

The compositions of this invention are prepared by first forming a solution in which a cross-linkable polyester polymer is dissolved in a solvent comprising at least one vinylidene monomer which is copolymerizable with the dissolved polyester. There is next added to this solution a polymerization catalyst, a gel promoter and a polymerization inhibitor. The mixture is then mixed at an appropriate temperature until it gels or sets into a cold shapable mass of the desired consistency.

There may be added to the cross-linkable composition, either before or after the gelling step, various mold lubricants, coloring agents, fillers, reinforcing fibers, foaming agents and other polymeric modifiers appropriate to the proposed application of the final composition. Generally, if the entire batch is to be utilized for the same purpose, for example the preparation of thin walled tubes, the selected modifiers will be added before gelling. But if a portion is to be utilized for one product and a portion for another, the modifying agents will not be added until the gel is to be used. The identity of the polymeric modifier or modifiers added is not critical. They will be selected in accordance with standard procedures based on the end use and other known factors.

The fact that the modifiers can be added subsequent to gel formation is of special interest since it is possible to prepare in a single operation all of the gel required for the subsequent production of several types of products which differ only in their color, proportion of reinforcing fibers used, length of such fibers, and similar characteristics. This procedure is completely inapplicable to previously known compositions since the previously known compositions could not be stored any appreciable length of time.

The polymeric products prepared using the process of this invention are all of gel-like moldable consistency and may be stored for extended periods of time, even up to several months or more. The exact consistency depends principally on the nature of the polyester, the nature of the monomer and the quantity of the promoter. It will also vary although to a lesser extent, with the amount of catalyst and the amount of inhibitor present. Temperature has a minor effort and serves mostly to vary the time of gel formation. Thus at higher temperatures the gel will form more rapidly. For example, a specific polyester composition made up of 4 parts ethyleneglycol, 1 part propylene glycol, 3 parts maleic acid and 2 parts phthalic anhydride and containing 2% benzoyl peroxide, 0.05% stannous chloride and 0.03% topanol can be gelled in one hour at 15% C., in twenty minutes at 24° C. or in one to two minutes at 80° C. The final gelled products are of substantially the same consistency.

The exact temperature and time of gel formation is a matter of choice for the operator. Heat may be externally applied or the heat of the reaction may serve to maintain the desired temperature. In reactions involving industrial quantities the heat of reaction is generally sufficient. For most compositions the reaction temperature is between 10° C. and 80° C. The preferred temperature range is 15 to 30° C. since this combines relatively simple temperature control with practical reaction periods. Temperatures below 10° C. and above 80° C. even up to the temperature at which the resin will thermoset may be employed, but for ready preparation of moldable compositions with a minimum of difficulty 10°–80° C. is employed.

The time of reaction is not critical and will be selected on the basis of the foregoing principles. As would be expected, the more viscous gels are obtained with long reaction periods.

The term "consistency" as used herein should be understood as referring to the weight in kilograms of material flowing in a period of 100 seconds through the metered orifice of the apparatus described in ASTM Standard 1955, reference ASTM D1238–525, under a load of 3.160 kg. at 20° C., 12 hours after the preparation of the gel under test.

Polyesters applicable to the preparation of the products of this invention are of the class well known in the art and include those derived by condensation of unsaturated dibasic acids or anhydrides with dihydroxy compounds and may include in the polymeric chain varying proportions of other saturated or aromatic dibasic acids and anhydrides which are not subject to cross-linking. The particular non-cross-linking moieties and their proportions will depend upon the desired properties of the final products. Maleic, chloromaleic and fumaric acid, which are preferred, may be mentioned as exemplary of unsaturated dibasic acids. Preferred aromatic and saturated acids and anhydrides which are exemplary of non-cross-linking moieties within the copolymer include:

Phthalic anhydride
Endomethylenetetrahydrophthalic acid
Tetrachlorophthalic acid
Hexachloroendomethylenetetrahydrophthalic acid
Adipic acid
Sebacic acid
Succinic acid Any of a variety of well known di- and trihydroxy compounds can be used for condensation with the diacids to produce the polyesters used in this invention. Preferred compounds, which are mentioned by way of example, of the large number of applicable compounds include, Ethylene glycol
Diethylene glycol
Propylene glycol
Polypropylene glycol
Glycerol
1,2-, 1,3-, and 1,4-butadienols
Trimethylol propane Cross-linking monomers which can be used in the practice of this invention include polymerizable vinylidene compounds having at least one olefinic unsaturation. A wide variety of these compounds are known including both aliphatic and aromatic unsaturated hydrocarbons and hydrocarbon derivatives, such as esters, acids and nitriles. There may be mentioned by way of example:

Styrene
Methyl styrene
Acrylonitrile
Methyl acrylate
Methyl methacrylate
Vinyl acetate
Allyl esters of phthalic, adipic, maleic, malonic, cyanuric and pyromellitic acids.

The quantity of vinylidene polymer used to prepare the compositions of this invention is from about 10% to about 60% by weight based on the weight of polyester. If more than one monomer is used, it will usually be found that any desired proportions within this range can be utilized. Thus styrene and methyl styrene can be used separately or in any desired proportions with methyl acrylate or methyl methacrylate ranging from about 0% to about 100% by weight but when styrene or methyl styrene are used with acrylonitrile or vinyl acetate the most desirable products, with respect to moldability and stability, are obtained if the percentage by weight of the last-named compounds is kept below 40%. However, useful products are obtained even if more acrylonitrile or vinyl acetate is used.

This invention includes within its scope moldable stable compositions prepared using one cross-linkable polyester and one vinylidene compound or a mixture of polyesters and vinyl compounds. It includes also compositions prepared by mixing a plurality of gels together. Thus a product of this invention may be prepared by cross-linking one or several polyesters with one or several vinyl compounds. Alternatively, a product may be prepared by completing two such reactions and mixing the resulting products.

Table I below indicates the composition of some products within the scope of this invention designated as Polyester A, Polyester B . . . Polyester F.

TABLE I

| Constituents | Cross-linkable Polyesters | | | | | |
|---|---|---|---|---|---|---|
| | A | B | C | D | E | F |
| Diethyleneglycol | | | | | | 5 |
| Ethyleneglycol | 4 | 5 | | | | |
| Propyleneglycol | 1 | | 5 | 5 | 5 | |
| Maleic acid | 3 | 2.5 | 5 | 2 | 3 | 3 |
| Phthalic anhydride | 2 | | | 3 | 2 | 2 |
| Hexachloroendomethylenetetrahydrophthalic acid | | 2.5 | | | | |

Table II shows typical stable compositions within the scope of this invention employing the polyesters of Table I, together with styrene as a cross-linking vinyl compound. The ingredients are listed in parts by weight. Thus a satisfactory composition may be obtained by mixing 100 parts by weight of Polyester A and 40 parts by weight of styrene.

TABLE II

| | A | B | C | D | E | F |
|---|---|---|---|---|---|---|
| Cross-linkable Polyester | 100 | 100 | 100 | 100 | 100 | 100 |
| Styrene | 40 | 27 | 33 | 51 | 58 | 46 |

To each of the above-indicated polyester compositions there is added a polymerization catalyst, a gel promoter and an inhibitor comprising benzoyl peroxide, stannous chloride and 4-methyl-2,6-di-tertiary butylphenol. The stannous chloride and the inhibitor are preferably added in solution in a solvent which can participate in the production of the final compositions. Thus the stannous chloride which may be used in the anhydrous or hydrated form is preferably added in a dihydroxy compound such as diethylene glycol which can react with the polyester and the inhibitor is preferably added in solution in a vinyl compound such as styrene which can participate in the final cross-linking reaction. For maximum effectiveness the concentration of the stannous chloride in the solution should be modified for each type of polyester composition used although useful compositions can be obtained at other concentrations. Table III shows preferred concentrations with various polyesters.

TABLE III

| Type of polyester | A | B | C | D | E | F |
|---|---|---|---|---|---|---|
| Percent Concentration of the SnCl$_2$ solution in diethyleneglycol | 20 | 10 | 20 | 33 | 33 | 33 |

Table IV shows various compositions within the scope of this invention and the consistency thereof obtained by modifying the polyester styrene compositions of Table II with varying proportions of a gel promoter and inhibitor as indicated. The inhibitor is 4-methyl-2,6-tertiary butylphenol and is introduced in the form of a 6% solution in styrene.

TABLE IV

| Consistency (kg.) | 0.05 | 0.1 | 0.2 | 0.3 | 0.4 | 0.5 |
|---|---|---|---|---|---|---|
| Proportion (percent of Table I) | 1.2 | 1.0 | 0.8 | 0.6 | 0.45 | 0.3 |
| Inhibitor percent | 0.04 | 0.045 | 0.055 | 0.06 | 0.07 | 0.08 |

Benzoyl peroxide is the polymerization initiator or polymerization catalyst. It is used in the range of from about 1 to about 2% by weight based on the weight of the polyester-vinylidene monomer composition.

As indicated above, stannous chloride is the gel promoter and it is preferably added in ethylene glycol, diethylene glycol or triethylene glycol solution. The gel promoter is preferably employed in the range of from about 0.05% to 0.3% by weight based on the weight of polyester-vinyl monomer employed.

The inhibitor is 4-methyl-2,6-tertiary butylphenol. It is employed within the range from about 0.025% to about 1% by weight based on the weight of polyester-vinyl compound employed.

As regards the filler materials usable in preparing the shapable masses or compounds of the invention, these may include conventional inorganic fillers such as carbonates, sulfates, phosphates, silica, silicate, micromica, dolomite, carborundum, asbestos, glass, sandstone, graphite and the like, reduced to fine powder, as well as organic materials such as polyolefines (polyethylene, polypropylene, polyisobutylene), polyvinyl chloride, carbon black and acetylene black, polyacrylates, polymethacrylates, polyacrylonitrile, polyvinyl acetate, polyphthalates, polystyrene, polyurethane, solid polyesters, phenol-formaldehyde resins, urea-formaldehyde resins, polyformol resins, polyamid resins, used in powder of appropriate granulometric composition ranging from very fine powder to granular size. The particles may sometimes fuse during the final cross-linking process.

As reinforcing fibre there may be used inorganic fibre such as glass fibre, preferably treated by plastic coating organic fibre such as polyamid, polyolefine, polyester fibre, especially polyethylene glycol terephthalate, polyurethane, polyacrylonitrile, cellulose acetate, and vegetable fibre such as flax, hemp, raffia, cisal, cotton, ramie and the like.

Mold lubricants which may be employed in the preparation of the compositions of this invention include mold lubricants well known in the art and the choice is not critical. There may be mentioned, by way of example, zinc stearate, calcium or magnesium stearate or oleate and zinc oleate. In some instances the mold lubricant may be omitted as where organic fillers having the property of being self-lubricating, such as polyolefines, polyvinylchloride and the like are employed.

Reference was made above to the fact that the polymer modifiers may be added before or after the gel formation. This is especially important in connection with the use of some commercial inorganic fillers which contain impurities such as iron salts which tend to accelerate the partial polymerization and with others, such as dolomites, which tend to retard this process. It is also important in connection with certain dyes and pigments which are known to have an accelerating reaction, such as chromophthals, or a retarding action, e.g. carbon black. Acetylene black is known to completely inhibit polymerization. Since a controlled partial polymerization is an essential stage in the formation of the moldable compositions of this invention, the addition of such accelerating or retarding ingredients prior to the gel formation would be highly undesirable.

Some of the advantages of the invention are listed below:

It is possible to use any unsaturated polyester regardless of its initial viscosity, since the monomer, e.g. styrene, associated with it will fluidize it and impart to it the requisite wetting power; and the partial polymerization effected during the formation of the gel will in every instance result in adjusting the consistency of the final compound in accordance with the requirements of the particular molding procedure with which such compound is intended to be used.

The method further makes it possible to use comparatively very high proportions of filler and reinforcing fibre additions.

Compositions produced in accordance with the improved processes taught by the invention may, where this is desired, be made to exhibit very low shrinkage or contraction in the mold. This results in increased ease in the final mold stripping operations, in the absence of cracks in the body of thick parts, the absence of distortion and cracking in parts having variable thickness dimensions, and high dimensional stability and a faithful reproduction of required dimensions to prescribed tolerances, so that subsequent turning or other machining operations are not required. In connection with this last feature, it is noted that such turning operations are apt to detract from the high surface hardness and polish of molded articles.

Further, the method of producing compositions as taught by the invention avoids the need of performing difficult and tedious cleaning operations on the mixer equipment, as when the color of the articles being produced is to be changed, this advantage arising from the fact that the partial polymerization imparts a non-sticky (non-"tacky") consistency to the moldable compositions.

Handling of the compositions is facilitated. Thus, they can be shaped at ordinary temperature into long slivers of cylindrical or polygonal prismatic shape of any desired cross section, within a sheath of flexible material such as polyethylene, cellulose acetate or the like, then cut up mechanically into pieces of suitable volume to be fed to shaping or molding equipment (such as injection-molding, extruding, or compressing machines) at any rate of feed dictated by commercial considerations.

Compositions produced according to the invention may be used in molding processes involving all of the present-day techniques such as injection-molding, transfercompression and extrusion, with only minor modifications in the equipment used. The novel compositions make it possible to produce large-sized articles having dimensions that could not heretofore be attained with the use of conventional plastic-shaping techniques. They can be stored at an ordinary temperature of say 20° C. for six months and more without substantial alteration.

In brief, the novel compositions solve the longstanding problem of producing articles from cross-linked polyesters by the same techniques as those used in shaping more conventional thermoplastic resins, in an extremely satisfactory manner.

The invention further contemplates certain modifications in the basic process of producing compositions as described above, in order to impart certain additional beneficial features to them without sacrificing any of the advantages hereinabove enumerated. A first such modification or refinement relates to the use of the novel compositions in coating textiles and the like, and a second modification relates to their use in producing spongy, and porous articles or "foams." The two modifications will now be described in succession.

(1) Experience with the novel compositions has shown that in some cases, their field of applicability could advantageously be extended to the production of novel coated textile and equivalent materials produced by weaving or other related techniques from fibre of inorganic, vegetable or animal origin.

In using the compositions for coating purposes, the consistency is adjusted to a selected value that will ensure an optimum wetting of the support or carrier material and this carrier material is then coated with the composition. The coated material can eventually be subjected to heat under pressure to effect the final polymerization.

In one modified procedure relating to this aspect of the invention, no reinforcing fibre is used while retaining all of the remaining ingredients described including the inorganic filler, so that it can be said that the place of the missing reinforcement is subsequently taken up by the fibrous material that is coated with the composition. The coated materials constitute intermediate products which are eventually molded under heat and pressure to convert them into the final cross-linked polymerized coated articles.

In another modified procedure, the filler addition is omitted (except possibly any pigments and dyes that may be desired) while the remaining ingredients, including the reinforcing fibre, are retained. The resulting products can then be converted into translucent final articles by molding under heat and pressure.

In a third modification, the consistency of the gelled mass is adjusted to a selected value to promote satisfactory wetting of a selected support or carrier in the form of a continuous sheet or web which may be woven or otherwise formed from inorganic or organic fibre. The mass is then coated over such support and the coated material can be stored and eventually heated under pressure to induce the final polymerization in the coating mass.

The first above-described modified procedure provides semi-finished products comprising a reinforcing sheet or web coated with a partly polymerized composition which provides the surfaces thereof, such semi-finished or intermediate products being later converted by conventional molding techniques into finished articles of any desired shape which will not require subsequent surface treatment. The finished articles may be useful in a variety of fields of industry, e.g. motor-car body construction, articles of furniture, machinery casings, building construction, wall surface coatings, etc.

The reinforcing sheet or carrier used may comprise such materials as crude, dyed or printed paper, mats, glass web, web of other inorganic or organic fibre, etc.

The use of the second above-described modified procedure provides semi-finished articles that are free of filler, and adapted to be converted, by conventional extrusion, injection, transfer or equivalent techniques, into translucent articles of any desired shape, such as flat or corrugated sheeting, piping, walls, household articles (dishes and utensils), and so on. The chief advantage of this modification lies in the possibility of using conventional techniques for the production of finished articles of uniform quality, which techniques cannot be used directly in connection with conventional compositions.

In regard to the third above specified modified procedure, this in turn can be performed in various ways. Thus, in one aspect of this modification, the coating operation is performed at a somewhat elevated temperature of say 40° C. conveniently using sets of heated rollers through which the web to be coated is passed and the coated web being thereafter passed through cooling rollers.

In accordance with another feature or aspect, the coated web may be further coated with at least one thin film of inert character, e.g. cellulose acetate, polyethylene or the like.

According to a third feature, the carrier web is woven or matted in such a manner as to be deformable between the convex and concave coacting mold surfaces during the final shaping of the article, preferably by molding at elevated temperature and under reduced pressure.

(2) The second major modification mentioned above is directed to the utilization of the two-stage polymerization process of the invention in connection with the production of recessed, porous or spongy articles, or "foam."

In the production of articles of this character, it is customary to add to the polyester to be polymerized a foaming agent which, when heated to a well-defined temperature, will decompose and thereby evolve gas. The resulting gas bubbles are distributed throughout the plastic mass to convert it into the desired foam product. Until now however successful results were not obtained when it was attempted to apply this conventional procedure to polyester base materials, because, depending on the nature of the foaming agent used, either it would decompose at so low a temperature that the polyester was hardly polymerized at all and hence so fluid that all the bubbles would quickly rise to the upper surface of its mass, or its decomposition temperature was so high that the polyester was substantially completely polymerized and was not capable of expanding substantially.

These difficulties are overcome when compositions according to the invention are used. In accordance herewith, the polyester mass to be expanded or converted to foam contains, in addition to the three basic ingredients of the invention (promoter, inhibitor and catalyst) a foaming agent so selected that its decomposition temperature has a value which is above that at which the moldable composition is formed and below that at which the final product is formed. Thus a moldable composition of this invention containing a foaming agent is provided. Since the product is of gel-like consistency the bubbles of gas do not rise to the surface.

Generally speaking, it should be understood that whatever the form of embodiment of the invention used the nature and proportions of filler and reinforcement added should be selected with due regard to the particular type of finished article to be produced. Thus in preparing a composition that is to be made into casings for electrical equipment, e.g. connection boxes, it is evident that the use of electrically conductive filler material should generally be avoided, but filler substances having optimum dielectric properties should be used. Such considerations relating to the service requirements of the finished articles must in all cases be harmonized with considerations arising out of the requirements inherent to the process of the invention. Thus certain types of filler and reinforcement materials may have an accelerating action, while others may have a retarding or inhibiting action, on the final cross-linking polymerization of the polyesters. Such characteristics must obviously be taken into account.

A composition somewhat similar to the compositions of this invention have been previously described. Thus U.S. Patent 2,467,527 issued on April 19, 1949 describes a polyester-styrene composition containing a polymerization catalyst (lauric peroxide) a gel promoter (stannous chloride dihydrate) and hydroquinone or the monobenzyl ether of hydroquinone as an inhibitor. Although these compositions, which were intended as fast-setting compositions, have a superficial relationship to the compositions of this invention, the fact that the relationship is only superficial and does not in any way suggest the unique compositions described herein, is clearly apparent by reference to the accompanying drawings in which FIG. 1 is a graph showing the properties of a polyester-styrene mixture admixed with lauric peroxide as a polymerization catalyst;

Figure 1:
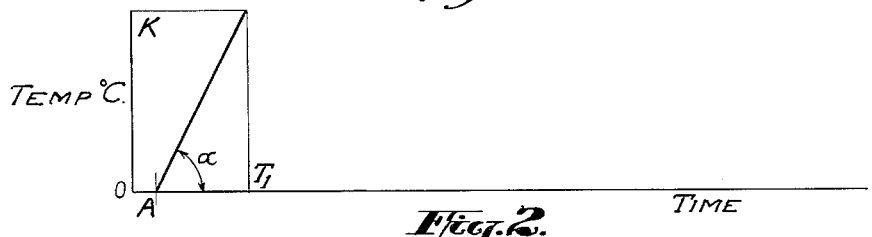
Figure 2:
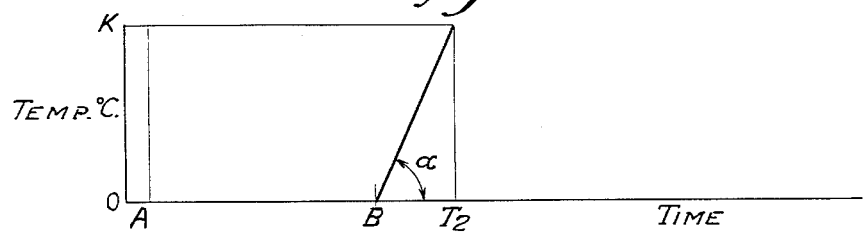
FIG. 2 is a graph showing the properties of an identical composition to which hydroquinone has been added as an inhibitor.
Figure 3:
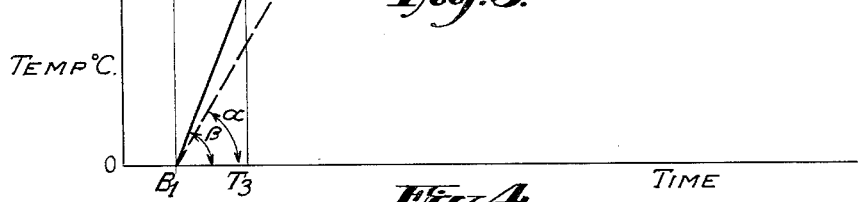
FIG. 3 is a graph showing the properties of a composition identical with that in FIG. 2 except that stannous chloride has been added as a gel promoter.
Figure 4:
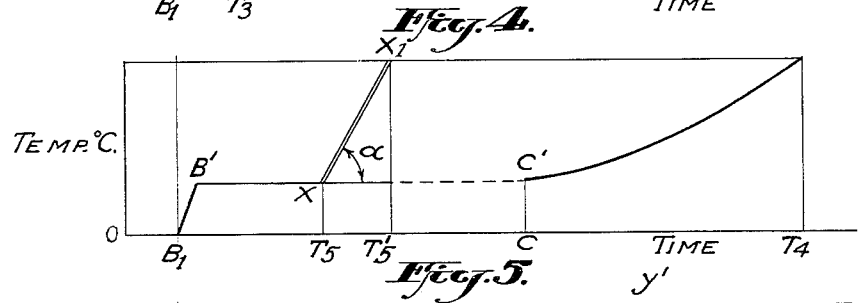
FIG. 4 is a graph showing the properties of a composition according to applicant's invention but using hydroquinone as an inhibitor.
Figure 5:
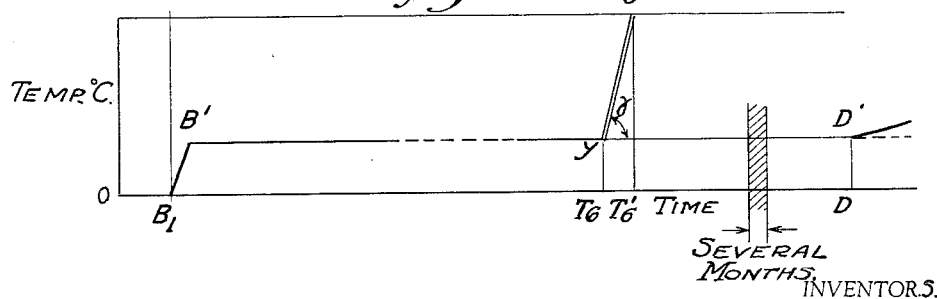
FIG. 5 is a graph showing the properties of a composition identical with that in FIG. 4 except that the hydroquinone has been replaced with 4-methyl-2,6-di-tertiary butylphenol.

Graph 1 illustrates the normal evolution of a catalyzed polyester-styrene composition bringing about full setting in a comparatively short time $T_1$ following a short induction period OA.

Graph 2 is similar to 1, the only effect of the inhibitor being to increase the induction period to a longer period OB followed by a relatively fast setting within the period $T_2$.

In each of the cases represented by graphs 1 and 2 the setting periods $T_1$ and $T_2$ are on the order of a few hours.

Graph 3 shows that the addition of an accelerator reduces the induction period of the composition illustrated in graph 2 to a period $OB_1$ and also considerably reduces the setting period $T_3$ as indicated in the raising of the slope of the setting curve from the angle $\alpha$ to the angle $\beta$.

Graph 4 illustrates the first novel effect not present in any of the previous compositions. Here it is seen that after an induction period of $OB_1$ the composition begins to react and then after it is set to the condition of a gel (point B') it remains stable for about one month (point C') and thereafter begins to harden spontaneously and gradually but at a rather rapid rate over a period of time $T_4$ which represents a period of several weeks. Furthermore, should the gel within its period of temporary stability between points B' and C' be heated, for example to 100° C. as shown at point X, the composition follows a setting curve XX' having the same slope $\alpha$ as illustrated in graphs 1 and 2 corresponding to a setting time $T_5$–$T_5'$ of the order of 10 to 15 minutes. This period is too long to enable convenient molding of articles under quantity production conditions.

Graph 5 illustrates the behavior of the composition according to the instant invention. Here there is an initial induction period $OB_1$ followed by a partial polymerization in which the composition sets to a gel as illustrated by the line $B_1B'$. There now follows a period in which the gelled composition remains absolutely unchanging for a period of 8 to 10 months as illustrated by the time D and thereafter begins a period of spontaneous evolution at an extremely slow rate, so slow in fact that a time period corresponding to $T_4$ in graph 4 cannot be practically measured or evaluated. Moreover, when the gel is heated to about 100° C. as shown by the line YY', the setting curve rises so sharply that the setting time $T_6$–$T_6'$ is about 10 to 15 seconds so that commercial molding becomes imminently feasible.

Except as otherwise indicated, the tests were carried out at about 18° C. The graphs are plotted in arbitrary units but on such scales as to be directly comparable one with the other.

It is apparent then that the compositions of this invention possesses new, unexpected and useful properties previously unknown in the art. The most marked advantages of the compositions of this invention are as follows:

(1) An extremely long stable period after gel formation.

(2) A very high setting rate of the gel on heating.

The following examples are given by way of illustration only and are not intended as limitations of this invention, many apparent variations of which are possible without departing from the spirit and the scope thereof.

*Example 1*

This composition is to be used in injection-molding a massive part in which the thickness dimension varies considerably from one portion to another (e.g. a low-tension insulator). To facilitate the transfer of material the compound used will contain a substantial proportion of filler material.

The first ingredients of the compound comprises 100 parts of an unsaturated polyester resin A produced by heating a mixture comprising:

4 mols ethyleneglycol
1 mol propyleneglycol
3 mols maleic acid
2 mols phthalic anhydride, and 40 parts of styrene To 1000 parts of said mixture are added:

| | Parts |
|---|---|
| Microcalcite (5 μ dia.) as inorganic filler | 1500 |
| Plastic-coated glass fibre (12.5 mm. lengths) | 300 |
| Zinc stearate (as the mold lubricant) | 50 |
| Benzoyl peroxide (the final polymerization catalyst) | 20 |
| 20% stannous chloride solution in diethyleneglycol (partial-polymerization promoter) | 8 |
| Topanol O, i.e. 4-methyl-2,6-ditertiobutylphenol (as inhibitor) | 0.6 |
| Titanium oxide (as pigment) | 19 |

The resulting gel-like composition retains its capacity to being shaped for long period of time and can at any time be molded into uniform articles, e.g. by injection-molding into a heated mold at 130° C. and under a pressure of 100 kg./sq. cm.

Example 2

This composition is used to injection-mold a thin-walled tubular part in a mold using a retractible taperless core, specifically to mold an hydraulic prop chamber for mining equipment. The molded part has the following dimensions: Inner dia.: 87 mm., outer dia.: 99 mm. Length: 750 mm.

Using substantially the same ingredients as in Example 1, the following modified proportions are used:

| | Parts |
|---|---|
| Polyester A | 100 |
| Styrene | 40 |

To 1000 parts of such mixture are added:

| | |
|---|---|
| Inorganic filler | 1200 |
| Glass fibre, 12.5 mm. long | 400 |
| Zinc stearate | 50 |
| Benzoyl peroxide catalyst | 20 |
| Promoter as in Example 1 | 8 |
| "Topanol O" inhibitor | 0.6 |
| Carbon black | 17 |

The resulting formable mass can be molded at any time subsequent to preparation within weeks or months therefrom, e.g. using the following molding conditions: Injection pressure 100 kg./cm., temperature 150° C., the compound being injected into a cold mold.

Example 3

This composition is for transfer-molding of a large-sized part having greatly varying thickness dimensions, specifically a porthole for a Sahara desert hutment, 600 mm. in diameter, molded integrally with a slider and links forming part of its actuating mechanism.

Using the same ingredients as above, the composition used is the following:

| | Parts |
|---|---|
| Polyester A | 100 |
| Styrene | 40 |

To 1000 parts of such mixture are added:

| | |
|---|---|
| Inorganic filler | 1400 |
| Glass fibre, 25 mm. long | 400 |
| Zinc stearate | 50 |
| Catalyst | 20 |
| Promoter | 8 |
| Inhibitor | 0.6 |
| Cadmium sulfide pigment | 18.5 |
| Phenyl salicylate (as light-stabilizer) | 0.58 |

The resulting composition can be shaped at any time within the ensuing weeks or months, by transfer-molding using 25 kg./sq. cm. transfer pressure, and a polymerization time of 2 minutes starting from a hot mold. Maximum thickness is 35 mm.

Example 4

This example relates to the transfer-compression molding of a thin-walled part, specifically a filing cabinet, dimensions 130 x 150 x 150 mm.; wall thickness 2 to 3 mm.

The same composition is used as in Example 1 and it is subsequently molded under the following conditions: Transfer pressure 50 kg./sq. cm., temperature 140° C., polymerization time 1 minute.

Example 5

This example is for continuous extrusion into a tube of profiled section, specifically a tube 20/27 mm. dia. The composition is the same as that in Example 2.

The finished composition is extruded under a pressure of 100 kg./sq.cm., the temperature on completion of the polymerization is 120° C.

Example 6

A mixture comprising 100 parts of unsaturated polyester resin A produced by heating a mixture comprising:

4 mols ethyleneglycol
1 mol propylene glycol
3 mols maleic acid
2 mols phthalic anhydride, and 40 parts of styrene.

To 1000 parts of said mixture are added:

| | Parts |
|---|---|
| Microcalcite (5μ dia.) as inorganic filler | 1500 |
| Plastic-coated glass fibre (12.5 mm. lengths) | 300 |
| Zinc stearate (as the mold lubricant) | 50 |
| Benzoyl peroxide (the final polymerization catalyst) | 20 |
| 20% stannous chloride solution in diethyleneglycol (partial-polymerization promoter) | 2.5 |
| Topanol O, i.e. 4-methyl-2,6-ditertiobutylphenol (as inhibitor) | .25 |
| Titanium oxide (as pigment) | 19 |

The resulting mixture was stirred at 10° C. for one hour to produce a product of gel-like consistency which remained stable for more than one month.

Example 7

A mixture comprising 100 parts of unsaturated polyester resin A produced by heating a mixture comprising:

4 mols ethyleneglycol
1 mol propyleneglycol
3 mols maleic acid
2 mols phthalic anhydride, and 40 parts of styrene To 1000 parts of said mixture are added:

| | Parts |
|---|---|
| Microcalcite (5μ dia.) as inorganic filler | 1500 |
| Plastic-coated glass fibre (12.5 mm. lengths) | 300 |
| Zinc stearate (as the mold lubricant) | 50 |
| Benzoyl peroxide (the final polymerization catalyst) | 20 |
| 20% stannous chloride solution in diethyleneglycol (partial-polymerization promoter) | 15 |
| Topanol O, i.e. 4-methyl-2,6-ditertiobutylphenol (as inhibitor) | .25 |
| Titanium oxide (as pigment) | 19 |

The resulting mixture was stirred at 80° C. for one minute to produce a product of gel-like consistency which remained stable for over two months storage.

Comparative tests were conducted to determine the performance of compositions according to the invention and comparable compositions of the prior art. For this purpose the compositions were subjected to a mechanical mixing step and the energy respectively absorbed in each case was measured. The mixing apparatus was a mixer of 5 liters useful capacity, powered by a motor developing 1.5 horsepower at 1000 r.p.m.

(1) The conventional composition was prepared from an unsaturated polyester with diallyl phthalate as a crosslinking agent. The viscosity was about 100 poises. Microcalcite of 5μ dia. was incorporated as filler, and glass fibre of the grade known as TSR roving, 12.5 mm. long was added as reinforcement. The test procedure was as follows:

To 1000 grams of the polyester 1500 grams of the inorganic filler and 50 grams zinc stearate were added, and this composition was placed in the mixer. The meters associated with the mixer motor then indicated 210 volts across the motor terminals, a current of 1.65 amps, and a motor speed of 970. r.p.m.

Glass fibre was then added until the mixer motor was on the verge of stalling. At this time the readings were: Voltage 210 volts, current 5 amps., motor speed 70 r.p.m. The total amount of fibre added at this time was 200 grams. The addition of this amount of fibre was effected over a time of 7 minutes, which also represents the corresponding mixing time.

(2) A compound according to the invention was prepared from unsaturated polyester and styrene as in Example 1. The viscosity was 100 poises. The filler and fiber used were the same as above. To 1000 grams of the polyester 1500 grams of the mineral fiber and 50 grams of zinc stearate were added and this mixture was introduced into the mixer. The motor readings were then 210 volts, 1.48 amps, 978 r.p.m. Glass fibre was then added and it was found that after 700 grams of fiber had been introduced into the mixture the meter readings were 210 volts, 2 amps, 930 r.p.m. It is seen that the addition of 3.5 times more glass fibre than it was possible to introduce in the case of conventional composition, resulted in a relatively small degree of braking of the motor and correspondingly low absorption of energy. The time of fiber addition and of satisfactory mixing was 10 minutes.

These tests show that compositions according to the invention have less mixing power requirements and are able to incorporate much higher proportions of reinforcement material in them, thereby attaining correspondingly higher mechanical characteristics, than is the case with comparable compounds of conventional types.

The ensuing Examples 8 to 14 illustrate applications of the invention where coating procedures are involved. Specifically Example 8 relates to the generic case where the coating composition includes both reinforcement and filler ingredients; Examples 9, 10 and 11 refer to the modification where the coating composition contains no reinforcing ingredient; Example 12 relates to the modification where the composition contains no filler; and Examples 13 and 14 depict the modification where there is neither filler nor reinforcing ingredients in the composition.

*Example 8*

A gel-like composition is prepared using the following ingredients in the parts by weight indicated:

| | Parts |
|---|---|
| Polyester resin A | 100 |
| Styrene | 40 |

To 1000 parts of such mixture are added:

| | |
|---|---|
| Antimony oxide (filler) | 295 |
| Plastic coated glass fibre 12.5 mm. long | 150 |
| Zinc stearate | 26 |
| Benzoyl peroxide catalyst | 20 |
| Stannous chloride promoter (conc. 25% in diethylene glycol) | 8.5 |
| 4-methyl-2,6-ditertiobutylphenol inhibitor | 0.6 |

No pigment was present.

Two sheets of kraft paper 0.3 mm. thick are coated with this composition in the proportion of from 30 to 80% by weight depending on the type of paper. The laminated sheets are compressed in a heated mold for an electrical junction box, under 100 kg./sq. cm. pressure and at 130° C. for two minutes to produce lightweight, strong box.

B—FIRST MODIFICATION

*Example 9*

To produce a wall surface panel for a bathroom a procedure similar to that of Example 8 is used except that the coating compound has the following composition:

| | Parts |
|---|---|
| Polyester resin A | 100 |
| Styrene | 40 |

To 1000 parts of said mixture are added:

| | |
|---|---|
| Titanium oxide pigment | 260 |
| Zinc stearate | 23 |
| Benzoyl peroxide catalyst | 20 |
| Stannous chloride promoter (15% in diethylene glycol) | 8 |
| 4-methyl-2,6-ditertiobutylphenol inhibitor | 0.6 |

The coloration is due to titanium oxide.

No glass fiber was added.

The consistency of the composition free of filler and fiber was 0.2 kg. Instead of a mold as in Example 8, a set of coating rolls were used.

As a variation to the coating procedure of Examples 8 and 9, the coating operation may be carried out using a plurality of sets of coating rolls at incrementally decreasing temperatures, including an output set of rolls at ordinary temperature; and the coated sheets may be sandwiched between outer sheets of inert material such as cellophane which may be recovered and reused.

*Example 10*

This composition is similar to that in Example 9 except as regards the following data:

| | Parts |
|---|---|
| Promoter (30% in diethylene glycol) | 6.5 |

Three plies of glass mat each weighing 900 grams per square centimeter are coated with the composition in a proportion of 2 to 2.5 kg. of composition per kg. of mat. The three coated plies are laminated and compressed in a door mold at a pressure of 100 kg./sq. cm. and at 130° C. for 2 minutes. A lightweight rigid door is produced.

*Example 11*

The compound used is similar in composition to that given in Example 9 except for the following data:

| | Parts |
|---|---|
| Promoter (20% in diethylene glycol) | 12 |

Two plies of a roving fabric each weighing 600 g./sq. cm. are coated with from 1 to 1.2 kg. of composition per kg. fabric. The two plies are laminated and molded into a motorcar hood. Due to the absence of surface fibers the resulting hood has a remarkably good surface condition comparable to that of a pumice-ground and spray-painted sheet steel hood.

*Example 12*

A composition is prepared with the following ingredients in the parts by weight indicated:

| | Parts |
|---|---|
| Polyester A | 100 |
| Styrene | 40 |

To 1000 parts of such mixture are added:

| | |
|---|---|
| Glass fiber | 350 |
| Zinc stearate | 25 |
| Benzoyl peroxide catalyst | 20 |
| Stannous chloride solution (20% in diethylene glycol) | 5 |
| 4-methyl-2,6-ditertiobutylphenol inhibitor | 10 |
| Cadmium sulfide as yellow pigment | 43 |

No filler is present.

The compound is injected into a lampshade mold under 100 kg./sq. cm. pressure at 130 C. for 3 minutes. A translucent lampshade is produced.

*Example 13*

The composition specified in Example 12 but without any fiber is first subjected to partial polymerization until it has reached a consistency of 0.380 kg. Then the partially polymerized mass is coated over jersey knit glass web. Panels are obtained which are adapted for a wide variety of purposes and are very simple to manufacture since they do not tend to exude polyester nor do they necessitate any subsequent treatment prior to the final cross-linking reaction. Moreover the panels are not sticky and are easy to handle.

*Example 14*

The procedure is generally similar to that in Example 13 except that the mass is brought by partial polymerization to a consistency of 0.01 kg. The resulting panels can then be cross-linked by heating them for about 10 seconds at 150° C., thus yielding an output rate comparable to that of metal sheet presses, e.g. in automobile body construction. Any suitable color can be imparted.

The products prepared in Examples 8–14 can be equally well prepared whether gel formation takes place:
  prior to the introduction of fillers, fibers, and coloring agents;
  after the introduction of fillers, fibers and coloring agents and prior to coating; or after coating.

The next examples relate to the production of foam product.

*Example 15*

Preparation of a rigid, filled foam.

To 100 parts of polyester D are added 51 parts of styrene.

To 1000 parts of this mixture are added:

| | Parts |
|---|---|
| Pulverized dolomite (80µ) | 120 |
| Ammonium hydrogen carbonate (pulv.) | 80 |
| Benzoyl peroxide | 15 |
| Stannous chloride (10% soln. in triethyleneglycol) | 20 |
| Topanol 0 | 10 |

A composition is formed, which is poured into a container to fill it only to one tenth of its capacity, and the filled container is placed 20 minutes in an oven at 110° C. At the end of this time the container is substantially filled with a stiff, uniform, cross-linked foam material having an apparent density of 0.10.

*Example 16*

Preparation of a semi-rigid non-filled foam.

To 100 parts of Polyester F are added 30 parts of styrene and 15 parts of acrylonitrile.

To 1000 parts of this mixture are added:

| | Parts |
|---|---|
| Glass fiber (7 mm.) | 50 |
| "Vulcacel" (porogen agent) | 20 |
| Benzoyl peroxide (catalyst) | 10 |
| Stannous chloride (10% soln. in triethyleneglycol) (promotor) | 20 |
| Topanol O | 10 |

There is obtained a composition which can be stored. It is thereafter rolled between cylinders and transferred by a conveyor belt through an oven having an internal temperature of 90° C. The rate of the conveyor is adjusted to provide a dwell time of about 20 minutes at this temperature. There is thus provided a continuous web of elastic cross-linked foam having an apparent density of 0.2.

Some further examples will not be given of the vast variety of applications of the method of the invention and the compositions produced in accordance therewith. While in each of the examples some particular feature or characteristic is more especially emphasized, this is for purposes of illustration only and it will be understood that various modified procedures can readily be conceived whereby combinations of such characteristics, as well as other characteristics and properties not explicitly mentioned, may be attained. In the ensuing examples the Polyesters A, B . . . F referred to are those bearing the same designations in Table I of this specification, and the above promoter, inhibitor and catalyst are employed at various concentrations within the above stated ranges.

*Application I.*—Coating webs of fibrous material.

Specific examples of the use of compositions according to the invention for this particular application have been extensively described in Examples 8 through 14 above and will not again be described in this section, but are simply mentioned for completeness.

*Application II.*—Light-reflecting surface finish.

The surface aspect of various articles can be greatly improved by the use of compositions according to the invention incorporating suitable filler materials having light-reflective properties. The filler materials used should have appropriate granulometric characteristics and a high degree of purity. Some specific examples will be given in this connection.

*Example 17*

A gel having a consistency of 0.1 kg. is prepared from Polyester E modified with respect to the composition given in Table II in the following way:

| | Parts |
|---|---|
| Cross-linkable polyester | 100 |
| Styrene monomer | 30 |
| Methyl methacrylate monomer | 30 |

To 1000 parts of the above mixture there are added:

| | |
|---|---|
| Phthalocyanin blue (pigment) | 0.25 |
| Mother-of-pearl pigment (ground fish scales) | 30 |

The resulting mixture is milled and a mass is obtained which may be stored for several months without loss of consistency and of molding properties. It can subsequently be molded under 20 kg./sq. cm. pressure and 130° C. temperature for 2 minutes to produce 20 mm.-diameter buttons which may be polished after molding to provide an attractive mother-of-pearl appearance.

*Example 18*

A 0.30 kg.-consistency gel is prepared from Polyester D as follows:

| | Parts |
|---|---|
| Cross-linkable polyester | 100 |
| Styrene monomer | 40 |
| Acrylonitrile monomer | 15 |

To 1000 parts of this mixture there are added 1500 parts high-purity $CaCO_3$ (with a content of Fe, Mn and other impurities less than 0.3%), 20 parts polyethylene, 1 part cadmium yellow and 300 parts glass fibre in 12 mm lengths. The resulting moldable mass can be stored for many months and then molded under 10 kg./sq. cm and at 130° C. for 1 minute into round flat dish-stands 30 cm. in diameter and 2.5 mm. thick, having a smooth, bright and attractive surface aspect and a high degree of flatness.

*Application III.*—Products requiring improved resistance to discoloration.

The tendency to discoloration, e.g. yellowing, of translucent materials is reduced by the addition of ultra-violet radiation absorbing agents such as the substance sold under the name "U.V. Absorber–9" which is 2-hydroxy-4-methoxy-benzophenone, in a proportion of 2 to 5 parts per 1000. Similarly opaque materials can be improved in the same respect by the addition of optically inert filler substances such as silica, barium sulfate glass powder, etc.

*Example 19*

Polyester D in Table II is modified as follows:

| | Parts |
|---|---|
| Cross-linkable polyester | 100 |
| Styrene monomer | 20 |
| Methyl methacrylate monomer | 40 |

The composition is gelled to a consistency of 0.5 kg. and to 1000 parts of it there are added 10 parts selenium red and 5 parts "U.V.Absorber–9'." The resulting composition is used to coat a web of glass fibre in the proportion of 400 parts glass for 1000 parts gel. The treated web can be stored for many months and then molded, e.g. into a dome roof for the natural illumination of halls, chapels and other buildings, 2 meters in diameter, under 3 kg./sq. cm. pressure at 120° C. for 45 seconds. These domes retain their translucent character and their original coloring (e.g. stained glass).

*Application IV.*—Products requiring improved heat resistance.

Heat resistance of compositions according to the invention is improved by utilizing, in addition to styrene, a monomer which at least is trifunctional, so as to form a macromolecular structure having a finer or narrower lattice structure. Such a derivative will have at least three degrees of freedom in the cross-linking action thereof. Suitable derivatives for this purpose include allyl tricyanurate and allyl pyromellate (or allyl benzenetetracarboxylate). In adidtion, conventional heat resistant filler substance is preferably used.

*Example 20*

Polyester C of table II is modified as follows:

| | Parts |
|---|---|
| Cross-linkable polyester | 100 |
| Styrene monomer | 25 |
| Triallyl cyanurate monomer | 20 |

The compound is gelled to a consistency of 0.4 kg. and to 1000 parts of it there are added 800 parts silica and 200 parts glass fibre cut to 12 mm. lengths. A moldable mass of stable consistency is produced which may be stored for several months and then continuously injected at 140° C. at a rate of about 30 cm. per minute to form a stiff piping 247/267 mm. in diameter suitable for the conduction of gaseous fluids up to 60° C. temperature.

*Application V.*—Products requiring improved mechanical properties.

The impact strength of the finished articles is greatly improved if the filler used includes ethyleneglycol polyterephthalate ("Tergal") fibre, and/or organic fillers such as polyethylene grains. Furthermore, self-lubricating properties may be imparted by using molybdenum sulfide and/or graphite filler.

*Example 21*

The properties of two similar polyester gels are compared, the one including glass fiber and the other "Tergal" fiber as filler or reinforcement therein. In both cases the gel composition is similar to that indicated in Table II as Polyester A, except that 10 parts of styrene therein are replaced with 10 parts of acrylonitrile.

In both cases the gel consistency is adjusted to 0.2 kg. then 1,500 parts calcium carbonate are added per 1000 parts of the gel. To a first sample, called *a*, of this composition, there are added 300 grams of 12 mm glass fiber, and to another sample, *b*, there is added 100 grams Tergal fiber of indeterminate length. Both samples are then tested for impact strength and Young's modulus. The following results are obtained:

| | Sample a | Sample b |
|---|---|---|
| Impact strength (kg./sq.cm.) | 64 | 76 |
| Young's modulus (kg./cm./sq.cm.) | 104,840 | 132,126 |

*Example 22*

To prepare molding compositions for use in producing self-lubricating mechanical parts, Polyester B of Table II is gelled to a consistency of 0.2 kg., and to 1000 parts of this gel there are added:

| | Parts |
|---|---|
| Calcium carbonate | 1000 |
| Graphite powder | 200 |
| Asbestos fiber, 15 mm. long | 100 |

From the same gel a moldable mass can be prepared by adding as fillers:

| | Parts |
|---|---|
| Calcium carbonate | 800 |
| Molybdenum sulfide | 250 |
| Asbestos fiber | 100 |

The moldable masses can be stored several months, and then molded under 10 kg./sq. cm. at 120° C. into shafts, bearings and the like. The second above mentioned composition yields parts adapted to be subjected to substantially higher service stresses.

*Application VI.*—Products having fire-repelling or self-extinguishing properties.

Such properties can be imparted, first by adding to the gel such fillers as chlorinated paraffins, vinyl chloride, antimony oxide and the like, and further by including in the polyester composition such ingredients as chlorinated and/or fluorinated acids, for example dichloromaleic acid, tetrachlorophthalic acid, hexachloro- and tetrafluoro - endo - methylene - tetrahydrophthalic acid, tetrafluorophthalic acid, hexachloroendomethylene tetrahydrophthalic acid, hexafluoroendomethylene - tetrahydrophthalic acid, and the like, and additionally, adding esters of boric acid and/or phosphoric esters, halogenated or non-halogenated.

*Example 23*

A gel of 0.4 kg. consistency is prepared from Polyester B in Table II modified as follows:

| | Parts |
|---|---|
| Cross-linkable polyester | 100 |
| Styrene | 20 |
| Allyl phthalate | 20 |
| Triphenyl-phosphate | 8 | and to 1000 parts of this gel are added:

| | |
|---|---|
| Silica | 1400 |
| Antimony oxide | 100 |
| Zinc stearate | 25 |
| Glass fiber, 12 mm. length | 300 |

The resulting mass can be stored and eventually molded under 10 kg./sq. cm. at 130° C. in minute into electric circuit-breaker boxes and electric motor casings.

*Example 24*

A gel of 0.5 kg. consistency is prepared from Polyester A of Table II modified to contain:

| | Parts |
|---|---|
| Cross-linkable polyester | 100 |
| Styrene monomer | 30 |
| Acrylonitrile monomer | 10 |
| Trichloroethyl phosphate | 15 |

To 1000 parts of this gel are added 1000 parts vinyl chloride, 50 parts antimony oxide, 300 parts calcium carbonate, 25 parts zinc stearate and 200 parts asbestos fibre. The resulting mass can be molded at a later time at a pressure 10 kg./sq. cm. and at 130° C. in 2 minutes into electric circuit-breaker boxes.

*Application VII.*—Products having improved resistance to chemical agents.

To achieve a high degree of inertness to reagents, such as acids, bases, solvents, etc., the filler materials incorporated into the compounds of the inveniton may be selected in accordance with the particular reagents contemplated.

Thus to achieve resistance to acids, inorganic fillers such as silica and barium sulfate may be used and/or organic fillers such as the polyolefines and polyvinyl acetate.

For resistance to bases, the same inorganic fillers can be used, while as organic fillers, polyolefines of appropriate molecular weight would be employed. Similarly where solvent-resistance is to be imparted to the product, organic fillers such as polyolefines and polyvinyl acetate may be used.

As an illustration of the surprising effect of a relatively small addition of such organic fillers, the results of some tests are given below which relate to a series of common corrosive agents reacted with moldable compositions, according to the invention in which different organic fillers are incorporated. To make the results more striking the selected compounds are ones that include as some of the ingredients therein substances which are normally prone to heavy attack by the reagents used.

The tested compound is Polyester A of Table II, gelled to a consistency of 0.3 kg. and having incorporated therein per 1000 grams:

| | Grams |
|---|---|
| Calcium carbonate | 1400 |
| Polyvinyl acetate | 100 |
| Polyacrylonitrile ("Orlon") | 300 |

The test procedure is to measure the loss of weight, in grams, of a 100 gram sample at the end of one week's immersion in the selected reagent. The table below indicates the test results for five different reagents. Sample $b$ is a sample of the compound just specified, while sample $a$ is a control having the same composition except that the polyvinyl acetate is omitted.

| Reagent applied | Loss of Weight | |
|---|---|---|
| | Sample $a$, grams | Sample $b$, grams |
| Ethanol | 0.48 | 0.10 |
| Acetone | 4.19 | 0.05 |
| Ethyl acetate | 2.10 | 0.04 |
| Automotive gasoline | 0.33 | 0.005 |
| Chlorine water | 9.00 | 3.00 |

In another series of tests the polyvinyl acetate was replaced with 50 g. polyethylene and the Orlon fibre replaced with glass fibre. The corresponding results are given in the following table wherein sample $a$ represents a control containing no polyethylene.

| Reagent applied | Sample $a$, grams | Sample $b$, grams |
|---|---|---|
| 10% sulfuric acid | 0.40 | 0.05 |
| 30% soda solution | 4.72 | 1.82 |
| Ethanol | 0.48 | 0.00 |
| Acetone | 4.19 | 1.16 |
| Ethyl acetate | 2.10 | 0.28 |

In both above examples the mechanical characteristics of the articles molded from the compositions are unimpaired, being identical whether or not the chemical-protective organic filler is added. The surface aspect of the moldings produced from the polyethylene-containing compositions, and to an even greater extent the polyvinyl acetate-containing compounds, is greatly improved.

*Application VIII.*—Production of moldable cellular materials.

For this purpose there are added to the compositions of the invention, reagents capable of evolving gas during the molding process thereby providing hard, reinforced, expanded or cellular molded articles.

Example 25

This example relates to the formation of a moldable cellular mass suitable for use in making elements of heat-insulation walls and partitions in buildings.

A gel of 0.4 kg. consistency is prepared from Polyested D modified to contain:

| | Parts |
|---|---|
| Cross-linkable polyester | 100 |
| Methyl methacrylate | 40 |
| Diallyl phthalate | 10 |

To 1000 parts of this gel there are added:

| | Parts |
|---|---|
| Ammonium bicarbonate | 200 |
| Calcium carbonate | 500 |
| Glass fibre, 7 mm. long | 200 |

The compound is stored and subsequently molded at 130° C. into expanded panels having 0.2 apparent density and possessing remarkably high mechanical properties due to the incorporated filler and reinforcing fiber.

Example 26

This example also relates to the production of porous elements suitable for building construction but further exhibiting fire-repellent or self extinguishing properties.

A gel of 0.4 kg. consistency is prepared from Polyester B modified to contain:

| | Parts |
|---|---|
| Cross-linkable polyester | 100 |
| Styrene | 20 |
| Methyl methacrylate | 15 |
| Triphenyl phosphate | 10 |

To 1000 parts of this gel are added:

| | Parts |
|---|---|
| Azobutyronitrile ("Porofor N") | 100 |
| Calcium carbonate | 700 |
| Antimony oxide | 300 |
| Zinc stearate | 25 |

The compound is stored and later molded above the decomposition temperature of the azobutyronitrile into strong, light-weight, fireproof expanded building elements.

Instead of the azobutyronitrile used as the swelling or foaming agent, diazoaminobenzene, dinitrosopentamethylenetetramine, 4-4'-oxy(bis)(benzene-sulfonyl-hydrazide), and others, may be used.

*Application IX.*—Products having improved "feel."

Moldable compositions according to the invention can be made to perfectly dry and non-sticky prior to use, by increasing the proportions of organic filler incorporated in them. Such compositions moreover yield moldings having a remarkably satisfactory surface condition and excellent mechanical characteristics as well as satisfactory performance when exposed to chemical reagents.

Example 27

A gel of 0.3 kg. consistency is prepared from Polyester A of Table II. To 1000 parts of this gel are added:

| | Parts |
|---|---|
| Calcium carbonate | 700 |
| Polyvinyl chloride | 800 |
| Styrene | 150 |
| Glass fibre, 12 mm. long | 300 |

The resulting moldable compositions are dry and non-sticky while being as easily moldable as other compositions of the invention. Such compositions may advantageously be used for molding small articles such as electric switch covers and other small parts which require relatively small accurately-metered amounts of the composition to be weighed at each molding operation.

*Application X.*—Articles requiring immunity from electrostatic charge by friction in service.

It has been found that among the many kinds of filler that may be introduced into the gel in compounding the masses of the invention, a particular type of acetylene black exhibits the property that the finished articles are entirely immune from electrostatic surface charge produced by friction. Only those types of acetylene black which are revealed by microscopic examination to possess a fibrous structure are found to possess this remarkable property.

Example 28

This example relates to the formation of a compound suitable for producing piping to be used in air distribution networks in coal mines where sparking due to static electric charges is prohibited on account of the firedamp hazard.

A gel of 0.4 kg. consistency is prepared having the following composition:

| | Parts |
|---|---|
| Polyester E | 80 |
| Polyester F | 20 |
| Styrene | 25 |
| Methylstyrene | 10 |
| Chlorinated paraffin, 35% Cl | 10 |

To 1000 parts of this gel are added:

| | |
|---|---|
| Antimony oxide | 100 |
| Fibrous acetylene black | 50 |

This gel is then coated over a roving fabric weighing 600 grams per sq. m. in a proportion of about 50% by weight. A flexible coated web of fabric is thus produced which is subsequently wound around a metal drum heated to 140° C. to provide piping. Preferably three laminated plies of coated fabric are used.

*Application XI.*—Improving the thermal conductivity of the products.

This result can be achieved by incorporating metal filler material in the compounds. It should be noted that whereas metal and alloys do not usually exhibit a marked influence on the final polymerization, their salts do sometimes affect the rate of final polymerization to a marked degree. Thus, aluminum salts retard the final polymerization reaction, iron salts accelerate it considerably, while copper and lead salts completely inhibit it.

Consequently the selected metal filler material should be added in the form of powder, flake, thin strips, or the like, substantially free of any salts, oxides and other compounds and thoroughly stripped of contaminants such as cutting lubricant, paraffin and the like.

*Example 29*

To prepare a moldable composition for the production of electrically heated mold sections having heating coils imbedded therein, a gel of 0.1 kg. consistency is prepared from Polyester D modified to contain:

| | Parts |
|---|---|
| Cross-linkable polyester | 100 |
| Styrene monomer | 35 |
| Allyl cyanurate monomer | 15 |

To 1000 parts of this gel there are added:

| | |
|---|---|
| Fine iron powder | 500 |
| Aluminum strip, 10 µ thick, 10 cm. long, 2–3 mm. wide | 50 |
| Glass fiber, 8 mm. long | 300 |
| Zinc stearate | 25 |

A stable composition is obtained which can be stored for many months and then molded at 5 kg./sq. cm. and 130° C. with imbedded insulated electric resistor or steam heating coils. The molds produced in this way can be made to have a high heat conductivity which is controllable by adjusting the proportion and physical form of the metallic filler material incorporated therein, and such molds do not require subsequent machining but can be directly used to mold various articles of complicated shape.

We claim:

1. A method of producing a polymerizable resinous composition which remains stable at ambient temperatures and retains a moldable consistency but can be hardened and set by heat and pressure which comprises dissolving a cross-linkable, unsaturated polyester resin in a vinylidene monomer solvent copolymerizable with said ester, the said solvent comprising from about 10% to about 60% of the total weight of the solution, adding thereto from about 1% to about 2% by weight of benzoyl peroxide, from about 0.05% to about 0.3% by weight of stannous chloride and from about 0.025% to about 1% by weight of 4-methyl-2,6-di-tertiary butylphenol, admixing said ingredients while maintaining the temperature at from about 10° C. to about 80° C. until a moldable mass of gel-like consistency is obtained.

2. A method as in claim 1 including the step of adding a mold lubricant prior to gell formation.

3. A method as in claim 1 including the step of adding reinforcing fibers prior to gel formation.

4. A method as in claim 1 including the step of adding reinforcing fibers prior to gell formation.

5. A method as in claim 1 including the step of adding a solid decomposable foaming agent having a decomposition temperature above that at which the composition gels and below that at which the composition is cured prior to gel formation.

6. A method as in claim 1 wherein the vinylidene monomer is selected from the group consisting of styrene, methyl styrene, acrylonitrile, methyl acrylate, methyl methacrylate, vinyl acetate and the allyl esters of phthalic, adipic, maleic, malonic, cyanuric and pyromellitic acid.

7. A method as in claim 1 wherein the cross-linkable, unsaturated polyester resin includes an acid selected from the group consisting of maleic, fumaric and chloromaleic acid, a polyhydroxy compound selected from the group consisting of ethylene glycol, diethylene glycol, propylene glycol, polypropylene glycol, glycerol 1,2-, 1,3- and 1,4-butadienols and trimethylolpropane and an acid selected from the group consisting of phthalic acid, endomethylenetetrahydrophthalic acid, tetrachlorophthalic acid, hexachloroendomethylenetetrahydrophthalic acid, adipic acid, sebacic acid, succinic acid and the anhydrides thereof.

8. A polymerizable resinous composition comprising a cross-linkable, unsaturated polyester resin, a vinylidene monomer solvent copolymerizable with the said ester, the said solvent comprising from about 10% to about 60% of the total weight of the solution, from about 1% to about 2% by weight of benzoyl peroxide, from about 0.05% to about 0.3% by weight of stannous chloride and from about 0.025% to about 1% by weight of 4-methyl-2,6-di-tertiary butylphenol.

9. A foamable, polymerizable resinous composition comprising a cross-linkable, unsaturated polyester resin, a vinylidene monomer solvent copolymerizable with the said ester, the said solvent comprising from about 10% to about 60% of the total weight of the solution, from about 1% to about 2% by weight of benzoyl peroxide, from about 0.05% to about 0.3% by weight of stannous chloride, from about 0.025% to about 1% by weight of 4-methyl-2,6-di-tertiary butylphenol and a foaming agent having a decomposition temperature above 80° C. and below the temperature at which the resinous composition is thermosetting.

References Cited by the Examiner

UNITED STATES PATENTS

| | | | |
|---|---|---|---|
| 2,467,527 | 4/1949 | Harris | 260—863 |
| 2,498,621 | 2/1950 | Kropa et al. | 260—2.5 |

SAMUEL H. BLECH, *Primary Examiner.*

LEON J. BERCOVITZ, MURRAY TILLMAN,
*Examiners.*